United States Patent [19]
Kida et al.

[11] Patent Number: 5,321,789
[45] Date of Patent: Jun. 14, 1994

[54] PROJECTION DISPLAY APPARATUS, AND LIGHT GUIDE TUBE/LIGHT VALVE FOR USE IN THE SAME

[75] Inventors: Hiroshi Kida; Masahiro Usui; Eiichi Toide; Shinsuke Shikama; Mitsushige Kondo, all of Nagaokakyo, Japan

[73] Assignee: Mitsubishi Denki Kabushiki Kaisha, Tokyo, Japan

[21] Appl. No.: 760,887

[22] Filed: Sep. 17, 1991

[30] Foreign Application Priority Data

Sep. 18, 1990 [JP] Japan .................................. 2-250497
Mar. 20, 1991 [JP] Japan .................................. 3-056782

[51] Int. Cl.⁵ .................................................. G02B 6/12
[52] U.S. Cl. ................................ 385/133; 385/115; 385/120; 385/60
[58] Field of Search ............... 385/133, 115, 116, 119, 385/120; 358/60, 42

[56] References Cited

U.S. PATENT DOCUMENTS

| | | | |
|---|---|---|---|
| 3,543,384 | 12/1970 | Hansen | 385/120 |
| 3,703,660 | 11/1972 | Fyler | 385/120 |
| 4,112,170 | 9/1978 | Rauscher | 385/120 |
| 4,486,760 | 12/1984 | Funada et al. | 359/42 |
| 4,874,227 | 10/1989 | Matsukawa et al. | 359/42 |

OTHER PUBLICATIONS

"A Full-Color Projection TV Using LC/Polymer Composite Light Valves" SID Jun. 1990 Digest.

*Primary Examiner*—Rodney B. Bovernick
*Assistant Examiner*—Stephen W. Barns

[57] ABSTRACT

A light valve is a planar member in which liquid crystals are hermetically sealed, and allows the transmission of light in an almost parallel direction and selectively scattering undesired light. On a rear surface of the light valve is disposed a light guide tube which contains a plurality of minute apertures. Alternatively, one of the substrates which constitute the light valve may be made of a fiber plate. The fiber plate has a structure in which short optical fibers are stacked. The light guide tube or the fiber plate converges a luminous flux emitted from the light valve to improve the contrast of an image. A projection display apparatus is constituted of a light source, a light valve, either a light guide tube or a fiber plate, a lens, and a projection lens. A luminous flux emitted from either the light guide tube or the fiber plate is incident on the pupil of the projection lens by way of the lens, and the projection lens casts this luminous flux onto a screen, thus forming a projected image. The selectively scattered undesired light cannot pass through the light guide tube or file plate.

56 Claims, 16 Drawing Sheets

PROJECTION DISPLAY APPARATUS, AND LIGHT GUIDE TUBE/LIGHT VALVE FOR USE IN THE SAME

BACKGROUND OF THE INVENTION

1. Field of the Invention:

This invention relates to an improvement in the brightness and contrast of a projection display apparatus for projecting images, which are produced on a light valve, enlarged onto a screen.

2. Description of the Related Arts:

Referring to FIG. 15 of accompanying drawings, a description will be given of a conventional projection display apparatus. In FIG. 15, reference numeral 1 designates a light source; while 9 and 10 designate a reflecting mirror and a lamp, respectively both of which constitute the light source 1; 2, represents a luminous flux emanated from the light source 1; 3, represents a polymer dispersed liquid crystal light valve; 5, represents a lens; 6, a diaphragm; 4, a projection lens; and 7, a screen.

The operation of the projection television apparatus in such a conventional device will now be described. The light source 1 irradiates a luminous flux 2 consisting of parallel light beams towards the light valve 3. A discharge bulb such as a metal halide lamp, a xenon lamp, or a halogen lamp, for instance, is generally used as the lamp 10 of the light source. Upon the surface of the light valve 3 is displayed an image, as will be described later, and the luminous flux incident on the inside of the light valve 3 is transmitted, or is dispersed dependent on the density and color of the image. The luminous flux depicted in solid lines emitted in parallel from the light valve 3 is converged at the diaphragm 6 by means of the lens 5, and then thus converged luminous flux is incident on the projection lens 4 after having passed through the diaphragm. Meanwhile, luminous flux 8, having been dispersed at the light valve 3 and passed through the lens 5, is cut off by the diaphragm 6, and hence the dispersed light will not enter the projection lens 4. Practically, the diaphragm 6 cuts off unwanted light, i.e., scattered light, and allows only the luminous flux emitted at right angles from the light valve 3 to travel to the projection lens 4, thereby improving the contrast of the image. The luminous flux having passed through the projection lens 4 is projected onto the screen 7 in the form of an enlarged image for entertainment purposes.

Next, the structure and operation of the conventional polymer dispersed liquid crystal light valve 3 will be described with reference to FIGS. 16 and 17. Liquid crystals 32 are dispersed in the form of droplets in the interior of a matrix composed of polymer 33, and such liquid crystals are sandwiched between two glass substrates 31a and 31b. The liquid crystal 32 together with the polymer 33 is hereinafter referred to as a polymer dispersed liquid crystal. Without the application of voltage (V=0) as shown in FIG. 16, the liquid crystals 32 in the droplets are arranged disorderly. In such a disordered state, there occurs a difference in refractive index, and incoming light turns into scattered light 2b. However, when a voltage V greater than a threshold voltage Vth is applied as shown in FIG. 17, the liquid crystals 32 become aligned in one direction. In the case where the liquid crystals 32 are arranged in one direction, if the refractive index is adjusted to the same refractive index as the polymer 33 in advance, the incoming light 2 will not undergo diffraction and becomes transmitted light 2a. With the increase of the voltage, the accuracy of the alignment of the liquid crystals 32 is improved, whereby the quantity of light transmitted is increased.

Referring to FIG. 18, the structure of the conventional light valve 3 is now explained. In FIG. 18, reference numeral 34 is a pixel; 35, a switching element; 36, a source electrode; and 37, a gate electrode. With such a structure, as is publicly known, the selection of the source electrode 36 and gate electrode 37 enables any desired pixel 34 to be turned on and off with the use of the switching element 35. As can be seen from the drawing, the array of electrodes addressed two-dimensionally constitute an image display element in two dimensions. Red (R), green (G), and blue (B) pixels are arranged in a triangular arrangement shown in FIG. 18. In order to make the pixels transmissive for three primary colors, a color filter for transmitting light is disposed for each pixel as conventionally practiced. A drawing of the color filter is omitted here for clarity.

In the conventional projection display apparatus having the structure as mentioned above, it was necessary to reduce the aperture diameter of the diaphragm 6 disposed right in front of the projection lens 4 to increase the contrast ratio. This, however, resulted in partial elimination of the transmitted light and decrease in the maximum brightness.

SUMMARY OF THE INVENTION

This invention is aimed at overcoming the drawbacks in the conventional arts described above, and an object of this invention is to provide a projection display apparatus capable of preventing light loss due to the elimination of light by the diaphragm 6 positioned right in front of the conventional projection lens 4, and providing image displays in high brightness.

To this aim, according to one aspect of this invention, there is provided a projection display apparatus comprising:

(A) a light source for irradiating a collimated luminous flux;

(B) a light valve for enabling the luminous flux emitted from the light source to be transmitted, and controlling the quantity of the luminous flux transmitted;

(C) a luminous flux selective means for selectively allowing a luminous flux which enters in a given direction among luminous fluxes emanated from the light source to be transmitted;

(D) a projection lens for projecting the luminous flux having passed through the light valve onto a screen; and (E) a lens for enabling the luminous flux selectively transmitted by the luminous flux selective means to be incident on the pupil of the projection lens. With the above structure, since a luminous flux having a high parallelism can be obtained from the luminous flux selective means, the diaphragm becomes unnecessary. This luminous flux is converged at the pupil of the projection lens, and images, enhanced in contrast by eliminating optical loss due to the diaphragm, are produced on the screen.

As the luminous flux selective means, there are proposed two types; one comprising a light guide tube, and the other comprising a light valve, one substrate of which is a fiber plate.

The light guide tube requires a plurality of minute apertures arrayed in parallel each having a hollow therein aligned in one direction, and a structure which enables the selective transmission of luminous flux being incident approximately along with the axis of the minute aperture. The light guide tube may be composed of a planar member through which a plurality of minute apertures in the form of parallel rectangular tunnels penetrate, or a plurality of hollow pipes staked together with their axes aligned.

Further, the light guide tube can be composed of metal, plastic, glass, ceramics, or the like. In the case of such a material, a plurality of minute apertures are formed by the use of a laser beam machining technique or an etching technique. Painting in black or matting the inner surface of the minute aperture to prevent the reflection of light lead to less scattered light.

The arrangement of minute apertures will result in further improvements in the efficiency of light conductivity. There are several arrangements proposed according to the teachings of the present application. In a first arrangement, the shape of the minute aperture is nearly the same as that of each pixel of the light valve. In a second arrangement, the minute aperture is arrayed nearly in alignment with the arrangement of each pixel of the light valve. In a third arrangement, the number of minute apertures is almost the same as that of the number of pixels in the light valve. Further, there may be considered an arrangement where one minute aperture corresponds to a plurality of pixels of the light valve.

The fiber plate primarily comprises a plurality of unit fibers parallel to each other with their axes aligned in such a manner as to enable the transmission of luminous flux incoming almost along the axes, and is in the form of a plate positioned parallel to the substrate. The fiber plate is used for one of the two plates which form the light valve. Practically, the light valve exemplifying this invention is composed of a plate substrate, a fiber plate, and means for controlling the amount of light being transmitted, the means including liquid crystals sandwiched between the substrate and the fiber plate.

The unit fiber has a structure similar to a structure which can be seen when cutting an optical fiber. There may be adopted for the unit fiber configurations such as a configuration where a core is directly coated with an absorber, and a configuration where a core is covered with a cladding having a refractive index different from that of the core and the thus covered core is further directly coated with the absorber. By the adoption of the former configuration, luminous flux being incident on the unit fiber at at least a predetermined angle is absorbed by the absorber, and consequently a parallel light is emitted as mentioned before. By the adoption of the latter configuration, luminous flux incident on the unit fiber at at least a predetermined angle is selectively reflected at a boundary surface between the core and the clad, and hence the radiation of the parallel light is effected.

With respect to the positional relationship between the light valve having the fiber plate and the lens, there are several contemplated configurations as described below. A first configuration is that the light valve is placed between the light source and the lens with its substrate facing the light source and the fiber plate facing the lens. In this case, the substrate needs to be composed of a material which allows the transmission of luminous flux from the light source. In such a configuration, the luminous flux radiated from the light source is first incident on the substrate, and hence luminous flux having passed through the substrate enters the liquid crystals and finally reaches the lens by way of the fiber plate. Here, this configuration may have a second substrate transmissive of light interposed between the first substrate and the fiber plate, so that the luminous flux having passed through the first substrate, liquid crystals, and the second electrode reaches the fiber plate.

A second configuration is that the light valve is positioned such that it is visible from both the light source and the lens in the same direction. In this case, the substrate must be composed of a material which causes light reflection. In such a configuration, the luminous flux emitted from the light source is incident on the fiber plate first, and enters the substrate via the liquid crystals. The substrate reflects the entered luminous flux, and the reflected luminous flux reaches the lens again via the liquid crystals and fiber plate.

Regarding the arrangement of the core, another configuration may be proposed. That is, the core is formed nearly the same as that of the pixels and arrayed in the same configuration and with the same pitch as the pixels, and the absorber confronts a region other than the pixels. This results in a further improvement in light efficiency.

This invention is applicable to a projection display apparatus having a structure using monochromatic light valves. The projection display apparatus having such a configuration is comprised of a plurality of separation mirrors for splitting the luminous flux emitted from the light source into the three primary colors, i.e., red, green, and blue, and a plurality of composition mirrors for combining the separated luminous fluxes. In the case where the light guide tube is employed, the configuration requires one set consisting of a light valve, a light guide tube, and a lens for respective primary colors, namely, three sets in total. In addition, in the case where the fiber plate is used, the configuration also needs one set consisting of a light valve having a fiber plate and a lens for each primary color, and hence three sets in total. With the structure set forth in the above, the advantage of this invention can be achieved only by the use of monochromatic light valves.

Further features of the invention, its nature and various advantages will become more apparent from the accompanying drawings and the following detailed description of the invention.

DETAILED DESCRIPTION OF PREFERRED EMBODIMENTS

First embodiment

Figure 1:
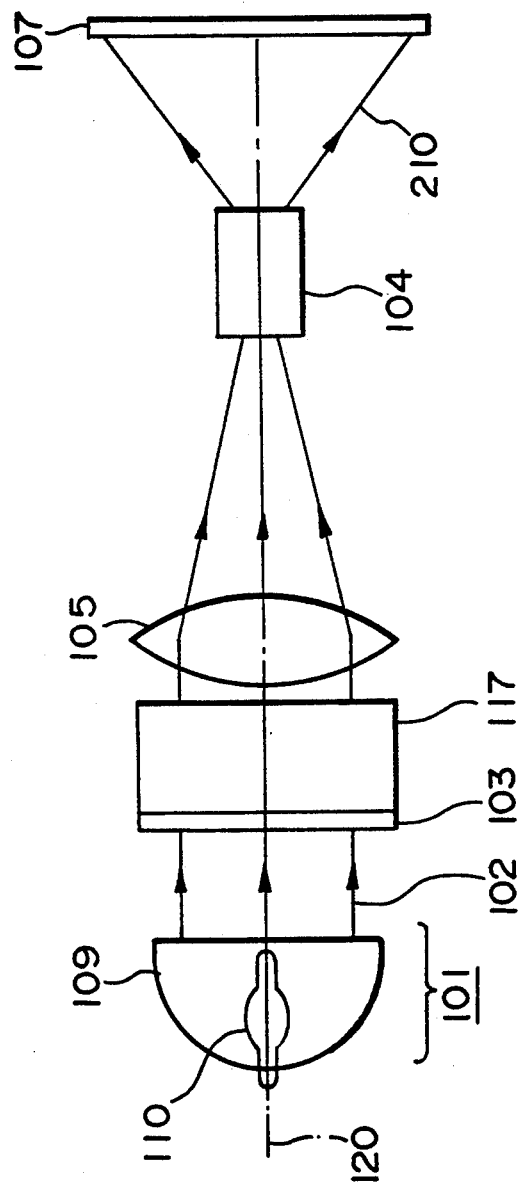
FIG. 1 is a schematic representation showing the structure of a projection display apparatus according to a first embodiment of this invention.

A projection display apparatus according to a first embodiment will be explained with reference to FIG. 1. In the drawing, reference numeral 101 designates a light source; 109 and 110 designates a reflecting mirror and a lamp, respectively which constitute the light source 101; 102 represents luminous flux emitted from the light source 101; 103 represents a polymer dispersed liquid crystal light valve; 117, a light guide tube; 105, a lens; 104, a projection lens; and 107, a screen.

The operation of the projection display apparatus will now be described.

The light source 101 irradiates the luminous flux 102 orthogonal to the surface of the light valve 103 and parallel to the optical axis 120. A discharge lamp such as a metal halide lamp, a xenon lamp, a halogen lamp or the like is used as the lamp 110 of the light source 101. For clarity, the operation of the light valve 103 is omitted because the operation of the light valve is similar to that of a conventional light valve. The luminous flux emitted by the light valve 103 is incident on the light guide tube 117. As will be described later, the light guide tube 117 serves to selectively pass only the luminous flux perpendicularly incident thereon, and hence the luminous flux passed through the light guide tube 117 is aligned parallel to an optical axis 120. Specifically, only a parallel luminous flux which effectively contributes to the forming of images can be obtained, and unwanted light scattered by the light valve is cut off, thereby improving the contrast of projected images finally obtained.

The luminous flux having passed through the light guide tube 117 is then incident on the pupil of the projection lens 104 with high effectiveness, and is projected in the form of projected light 210 to produce an enlarged image on the screen 107.

With such a structure, the transmitted light from the light valve 103, effective for producing images, can be utilized without substantial loss, providing projected images with high brightness.

The light guide tube 117 will be described hereinbelow.

Figure 2:
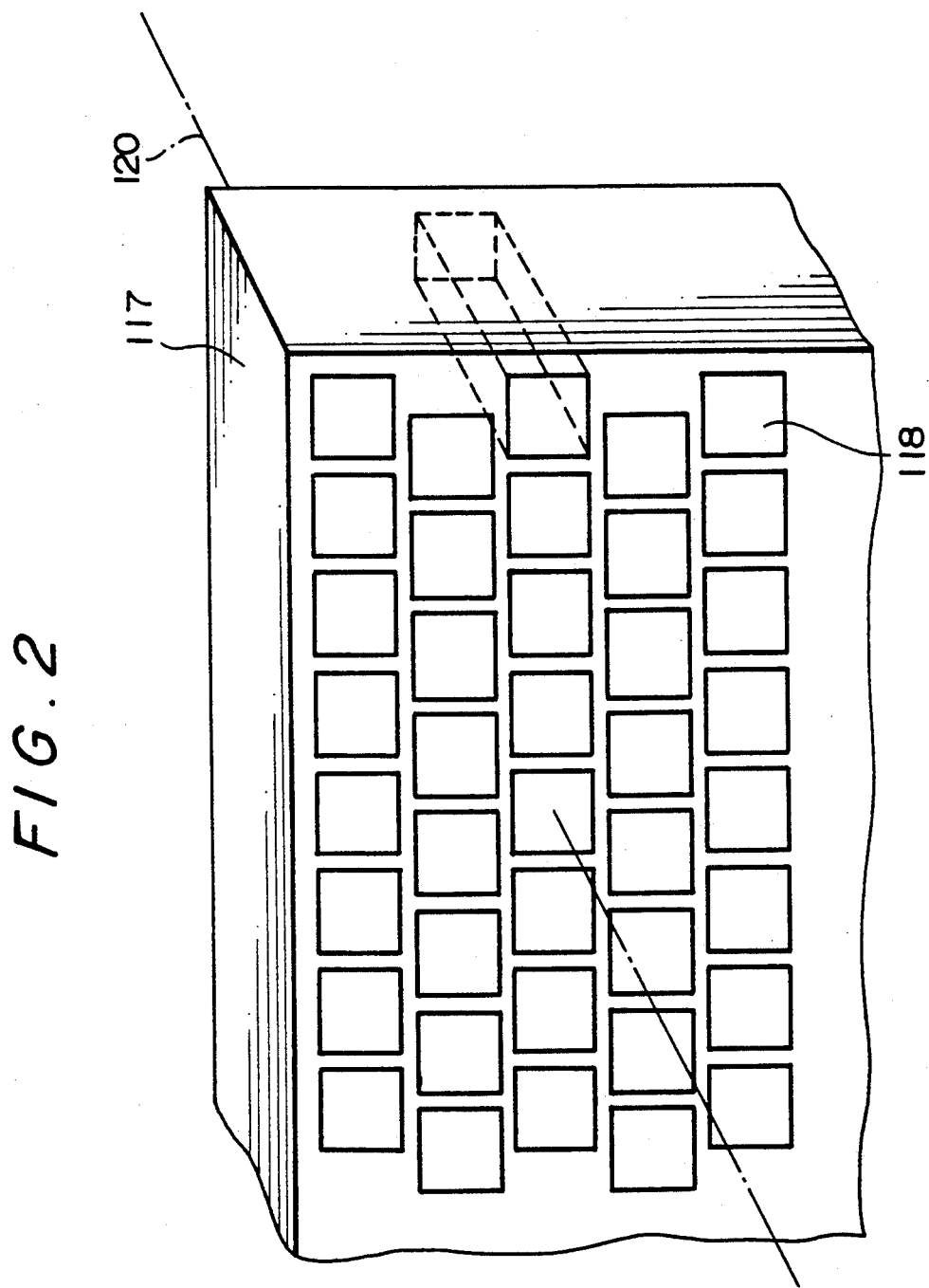
FIG. 2 is a perspective view showing the structure of a light guide tube used in the first embodiment.

FIG. 2 is a perspective view showing the light guide tube 117. The light guide tube 117 is made of material, such as metal, e.g., aluminum, plastic, glass, or ceramics. The light guide tube 117 has a plurality of apertures 118 formed by a laser machining machine or by means of etching in such a manner as to correspond to pixels on the light valve 103. The inner surface of each aperture has undergone a blackening or matting treatment so as not to cause the reflection of the luminous flux which has entered the aperture 118 within the light guide tube 117.

Figure 3:
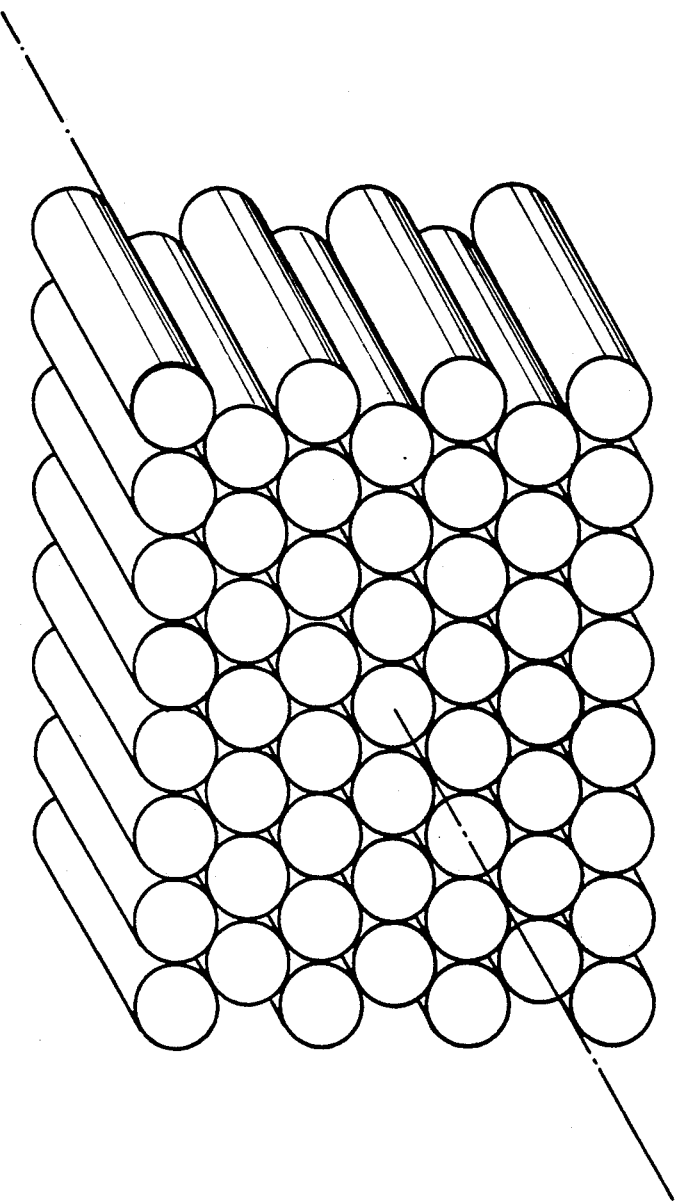
FIG. 3 is a perspective view showing a light guide tube having a circular aperture for use in a projection display apparatus according to a second embodiment of this invention.

FIG. 2 shows the rectangular apertures 118 disposed in a manner similar to the arrangement of the pixels of the light valve 103, namely, a triangular arrangement in this embodiment. Thus, matching of the pixels (transmissive regions of luminous flux) of the light valve 103 and the apertures 118 of the light guide tube 117 in arrangement and shape results in maximum utilization of light transmitted parallel to the axis of the apertures, thereby enhancing the brightness. Circular apertures also effect improvements in contrast, and can be particularly advantageous in enhancing the brightness. In the case where pixels of the liquid crystals are arranged in a widely known matrix array, that is, rectangular pixels are arranged in rows and columns, the apertures are also arranged in a corresponding matrix array. With such a structure, the light guide tube of this invention allows the selection of only luminous flux parallel to the light axis from incident luminous flux. If the diagonal distance of the rectangular aperture is 0.3 mm and the length of the light guide tube is 17.2 mm, an outgoing luminous flux is limited to within one degree. In this embodiment, the number of apertures was equivalent to that of the pixels of the light valve 103, but the same results are also obtained even when the number of apertures 118 is larger than the number of the pixels. Alternatively, the light guide tube may be formed of a plurality of circular apertures bunched together. The structure of the projection display apparatus according to the second embodiment shown in FIG. 3 can be formed by a technique for combining with each other minute circular pipes whose inner surface would preferably be matted.

Further, in either of the embodiments, although the number of apertures of the light guide tube is identical with the number of pixels, it is possible to assign one aperture to a plurality of pixels as an alternative arrangement.

Third embodiment

Figure 4:
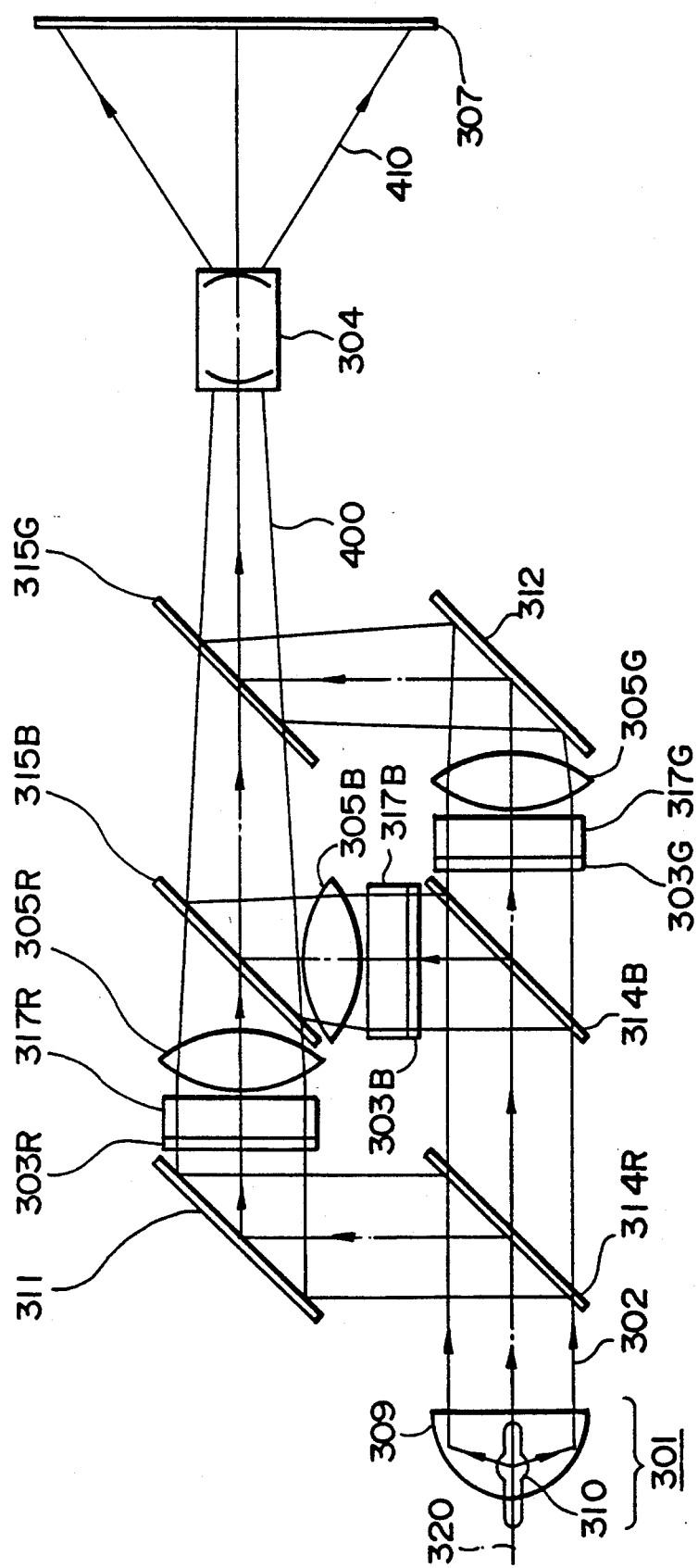
FIG. 4 is a schematic representation showing the structure of a projection display apparatus according to a third embodiment of this invention.

Referring to FIG. 4, a third embodiment will be described hereunder. Reference numeral 301 designates a light source; 309 and 310, designate a reflecting mirror and a lamp, respectively, which constitute the light source 301; 302, designates luminous flux; 314R and 314B, each designate dichroic mirrors for color separation use; 315B and 315G, each designate dichroic mirrors for color composition use; 311 and 312, each designate mirrors; 303R, 303G, and 303B, each designate light valves; 317R, 317G, and 317B, all designate light guide tubes; 305R, 305G, and 305B, all designate lenses; and 304, designates a projection lens.

The operation of a projection display apparatus according to a third embodiment of this invention will be described hereunder. In the same manner as the embodiments of FIGS. 1-3, the luminous flux 302 is emitted by the light source 301 in the form of parallel luminous flux. The dichroic mirror 314R reflects red color light and allows blue and green light to pass through. The dichroic mirror 314B reflects blue light and allows green light to pass through. Accordingly, the light valves 303R, 303G, and 303B are irradiated by red, green and blue luminous fluxes, respectively. The light valves 303R, 303G, and 303B are driven by a non-illustrated external circuit, and an image corresponding to each color component is formed on the surface of the light valves 303R, 303G, and 303B, respectively. The incoming luminous fluxes received at the light valves 303R, 303G, and 303B pass through, or are scattered, inside light valves 303R, 303G, and 303B. The outgoing light from the light valves 303R, 303G, and 303B are only the result of luminous flux parallel to the optical axis 320 because of the function of the light guide tubes 317R, 317G, and 317B. A single function of the light guide tubes 317R, 317G, and 317B is the same as that in the embodiments of FIGS. 1-3. The luminous fluxes emitted in parallel from the light guide tubes 317R, 317G, and 317B are incident on the projection lens 304 in the form of a combined luminous flux 400 by way of the dichroic mirror 315B for reflecting blue light, the dichroic mirror 315G for reflecting green light, and the reflecting mirror 312. This combined luminous flux 400 is projected on to the screen 307 as images, whereby an enlarged color image is provided for entertainment purposes. Though the structure and operation of the light valves 303R, 303G, and 303B are almost similar to those of the light valves described with reference to FIGS. 16 to 18, the light valves of this embodiment have no pixels corresponding to red, green, and blue colors, and are different in that they have black panels are used instead of the pixels. With such a structure, the luminous flux, which contribute to forming of images, emitted from the light valve at right angles can be utilized without any substantial loss, thereby cutting off the unwanted light scattered by the light valves. Therefore, as with the embodiments of FIGS. 1-3, a projected image superior in brightness and contrast is obtained.

As previously described, according to the above described embodiments, the combination of the light valve and light guide tube contributes to forming images with effectiveness, and it becomes possible to selectively obtain the luminous flux emitted from the light valve at right angles, and to cut off unwanted light scattered by the light valve. Moreover, since the use of lenses allows most of the foregoing effective luminous flux to be incident on the pupil of the projection lens without substantial loss, it is possible to provide a projection display apparatus capable of producing images improved in brightness and contrast.

Fourth embodiment

Figure 5:
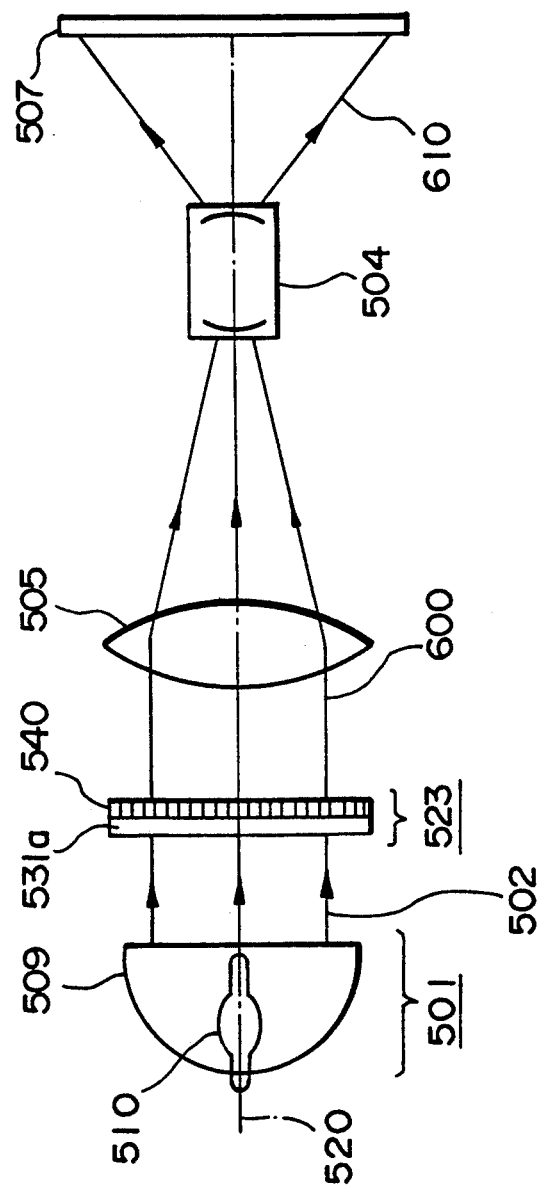
FIG. 5 is a schematic representation showing the structure of a projection display apparatus according to a fourth embodiment of this invention.

FIG. 5 shows the structure of a liquid crystal projection display apparatus according to a fourth embodiment of this invention. In FIG. 5, reference numeral 501 designates a light source; 509 and 510, designate a reflecting mirror and a lamp, respectively, which constitute the light source 501; and 502 designate luminous flux emitted from the light source 501; 523, numeral a polymer dispersed liquid crystal light valve comprised of an incoming-side substrate 531a made of glass, an outgoing-side substrate 540 made of fiber plate, and polymer dispersed liquid crystals sandwiched therebetween; the polymer dispersed liquid crystal light valve changing between transparent and scattering states with the application of a voltage, numeral 505 designate a lens; 504, a projection lens; and 507, a screen. For simplicity, the polymer dispersed liquid crystal material is not illustrated in FIG. 5.

The operation of the projection display apparatus according to this embodiment will be described hereinbelow. The light source 501 irradiates luminous flux 502 parallel to the light valve 523. The lamp 510 of the light source 501 used may be used a discharge lamp such as a metal halide lamp, a xenon lamp, or a halogen lamp operating with the reflecting mirror 509. The luminous flux 502 passes through, or is scattered by, the polymer dispersed liquid crystals of the light valve 523 depending on the light and shade as well as the color of the image. The optical principles of operation of the polymer dispersed liquid crystal light valve are the same as set forth in the above with reference to FIGS. 16 and 17.

The fiber plate 540 disposed at the outgoing side of the light valve 523 is composed of a plurality of unit fibers integrated within a plane, as will be described later, and serves to pass only luminous flux being incident at right angles to the plate surface. For this reason, the luminous flux passed through the fiber plate 540 is composed of components parallel to the optical axis 520. Since the parallel luminous flux contributes to forming of images can be selectively obtained, and since unwanted light scattered by the light valve can be eliminated, images finally obtained are superior in contrast. Details of the fiber plate will be described later.

Luminous flux 600 having passed through the fiber plate 540 is made incident to the pupil of the projection lens 504 by means of the lens 505 exhibiting high efficiency, and is projected onto the screen 507 in the form of projected light 610 to produce an enlarged image.

By employing such an optical system as mentioned above, light, having passed through the light valve 523, which is effective in forming images may be utilized without any substantial loss, whereby it becomes possible to produce projected images with high brightness.

Figure 6:
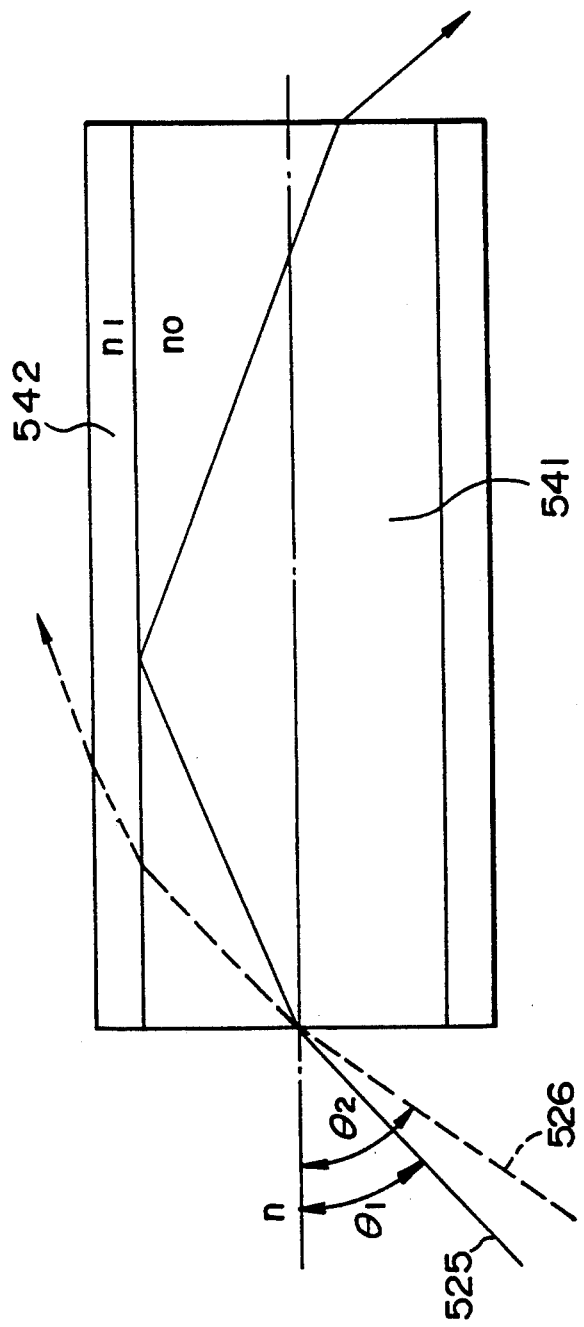
FIG. 6 is an explanatory view illustrating the principle of a fiber plate for use in the projection display apparatus according to the fourth embodiment.

The fiber plate 540 will be described hereunder. FIG. 6 is a principle diagram of a unit fiber which is a constituent of the fiber plate 540. The fiber is composed of the core 541 for transmitting light and the cladding 542 which is a coating material of the core. Like the light 525 in solid line as shown in FIG. 6, the light propagates along the interior of the core by causing a total reflection due to a difference of refractive indices at the boundary between the core 541 and the cladding 542.

The incident angle $\theta_1$ is less than a maximum incident angle $\theta_{max}$ expressed by $$NA = n \cdot \sin \theta_{max} = \sqrt{(n_0^2 - n_1^2)} \quad (1)$$

where, $n_0 > n_1$

NA: a numerical aperture of a fiber
$\theta_{max}$: a maximum incident angle
$n_0$: a refractive index of core
$n_1$: a refractive index of clad
n: a refractive index of the exterior of fiber Light incident on at an angle of $\theta_2$ greater than a maximum incident angle $\theta_{max}$ passes through the fiber as a light 526 in dotted lines.

Figure 7:
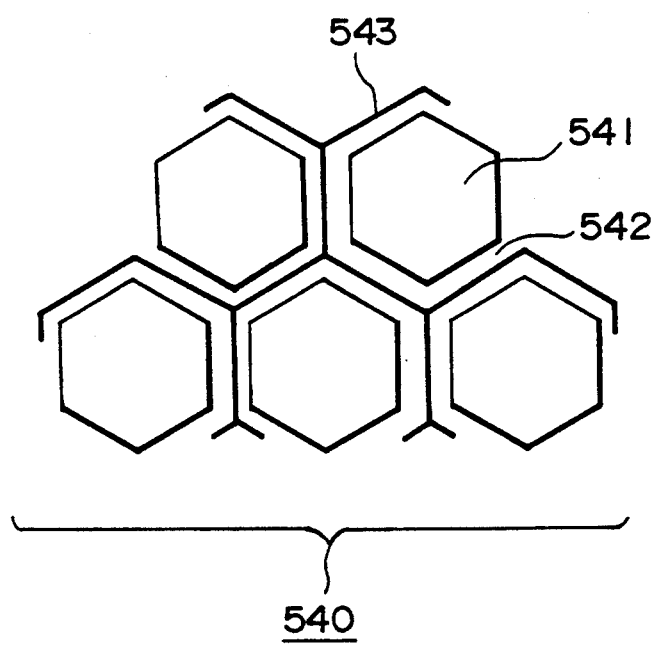
FIG. 7 is an explanatory view illustrating the structure of the fiber plate for use in the projection display apparatus according to the fourth embodiment.

FIG. 7 is a plan view showing the structure of the fiber plate 540. The fiber plate 540 is made up of the core 541, the cladding 542, and the absorber 543 coated over the cladding 542. The absorber 543 effects the absorption of light which has leaked out when incident on the core 541 at an angle more than the maximum incidence angle $\theta_{max}$.

The unit fiber is of hexagonal form in the fiber plate 540 shown in FIG. 7, but may be formed in another shape. If the shape, arrangement structure, and pitch of cores 541 are identical with the pixel of the liquid crystal light valve, and if the cladding 542 and absorber 543 are superimposed over conductor patterns, the utilization efficiency of parallel transmitted lights becomes a maximum, whereby it becomes possible to provide a projection display apparatus with an excellent brightness performance.

Figure 8:
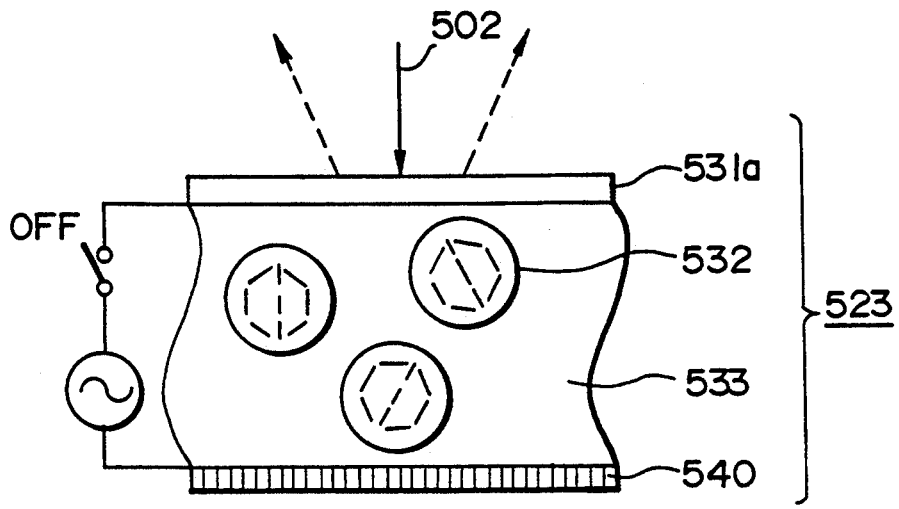
FIG. 8 is a cross-sectional view for explaining one operation of a light valve for use in the projection display apparatus according to the fourth embodiment.
Figure 9:
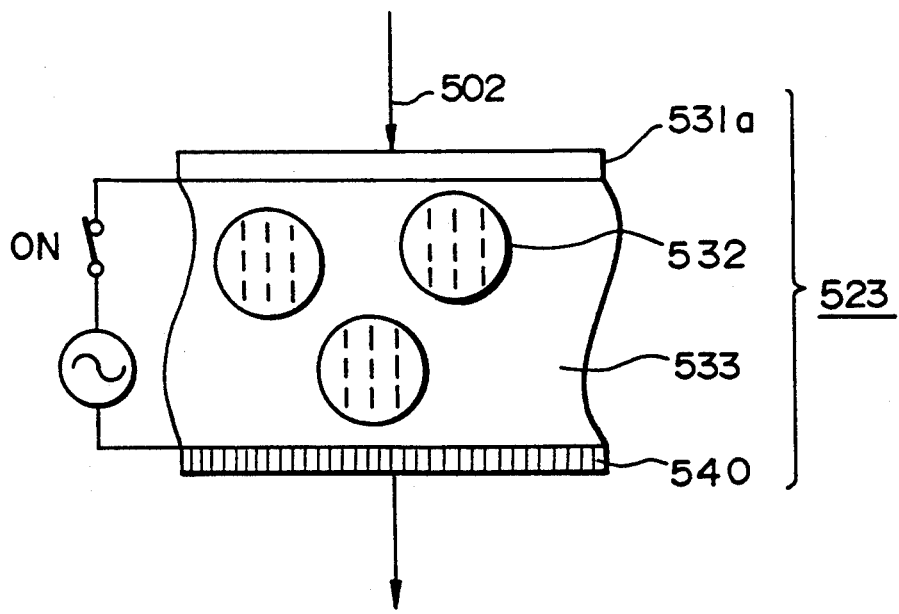
FIG. 9 is a cross-sectional view for explaining another operation of a light valve for use in the projection display apparatus according to the fourth embodiment.

FIGS. 8 and 9 are cross-sectional views showing the light valve 523. Without application of a voltage, light incident at an angle more than the maximum incident angle $\theta_{max}$ of the fiber plate 540 is the major component of the light scattered at the polymer dispersed liquid crystal layer consisting of a liquid crystal layer 532 in droplet from and a polymer 533, and consequently most of the scattered light is absorbed inside of the fiber plate 540. Therefore, there is less light transmitted from the fiber plate 540, which corresponds to the pixel being applied with 0 voltage. Meanwhile, since the light transmitted from the plate corresponding to the pixel with a voltage applied is a parallel luminous flux, the transmitted light can pass through the fiber plate 540 with less loss. In order to improve the efficiency in absorbing scattered light, it is effective to reduce the maximum incident angle $\theta_{max}$ in the expression (1). For this purpose, the $n_0$ and $n_1$ should be approximately the same. According to the study conducted by inventors, in order to secure the contrast sufficient to effect a display of television pictures, it is necessary to have $$NA \leq 0.2 \quad (2)$$

and, in the case of $n = 1.5$, in order to satisfy an equation $$NA = \sqrt{(n_0^1 - n_0^1)} \leq 0.2 \quad (3)$$

it is necessary to select n within the range below $$1.487 < n_1 < 1.5 \quad (4)$$

The liquid crystals are not limited only to the polymer dispersed liquid crystals, but may be liquid crystals of the dynamic scattering mode, which are arranged in well-defined order without the application of voltage but which become opaque on application of a voltage due to a local change in the refractive index caused when the arrangement of liquid crystals is disordered with the electric current. Alternatively, there may be used liquid crystals having phase change characteristics that occur dependent of a voltage applied between two modes, that is, cholesteric and nematic states in which the liquid crystal becomes transparent and scattered.

Figure 10:
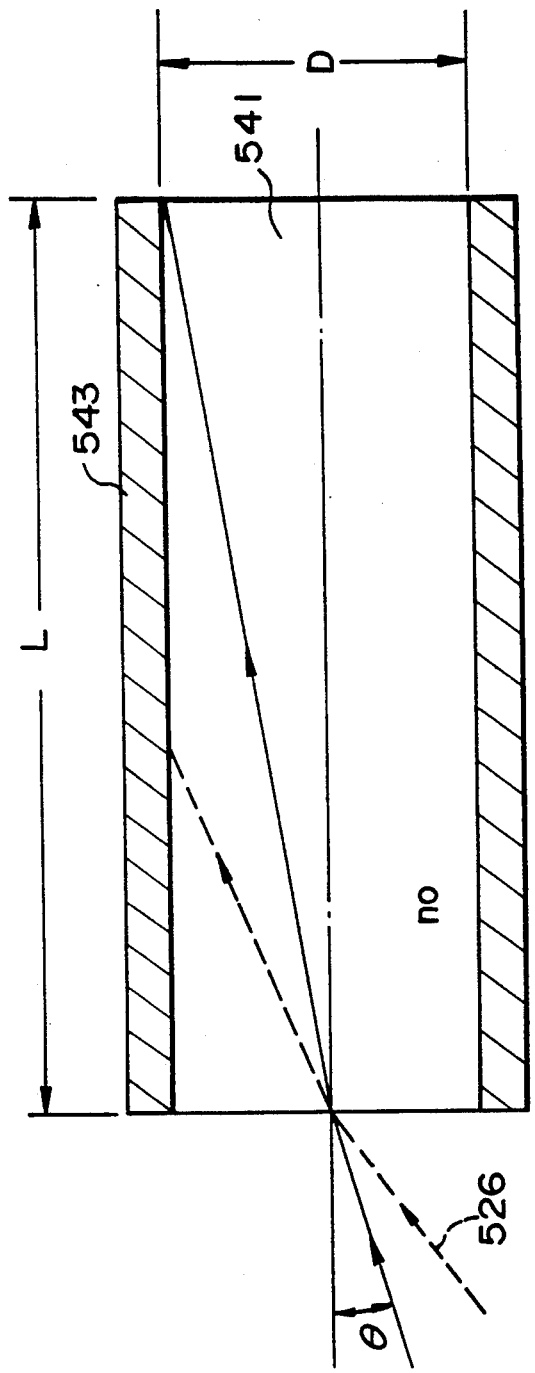
FIG. 10 is a structural explanatory view illustrating the principle of another fiber plate for use in the projection display apparatus according to the fourth embodiment.

The fiber plate may be fabricated without a cladding layer as shown in FIG. 10 which illustrates a unit fiber, namely, composed simply of the core 541 and the absorber 543. If notice is drawn to light entering along the center of the core 541, light entering at an angle more than the incident angle $\theta$, or luminous flux 526 designated in dotted lines in the drawing, is absorbed by the absorber 543. In order to reduce the reflection occurred between the absorber 543 and the core 541, the refractive index of the absorber 543 needs to be larger than that of the core 541. Assuming that the diameter D of the fiber is 0.02 mm, the length of the fiber is 1 mm, a refractive index $n_0$ of the core is 1.5, and air is present at the exterior of the fiber on outgoing side, a scattered luminous flux generated at the liquid crystals can be restricted to luminous flux emitted within 1.7 degrees.

Fifth Embodiment

Figure 11:
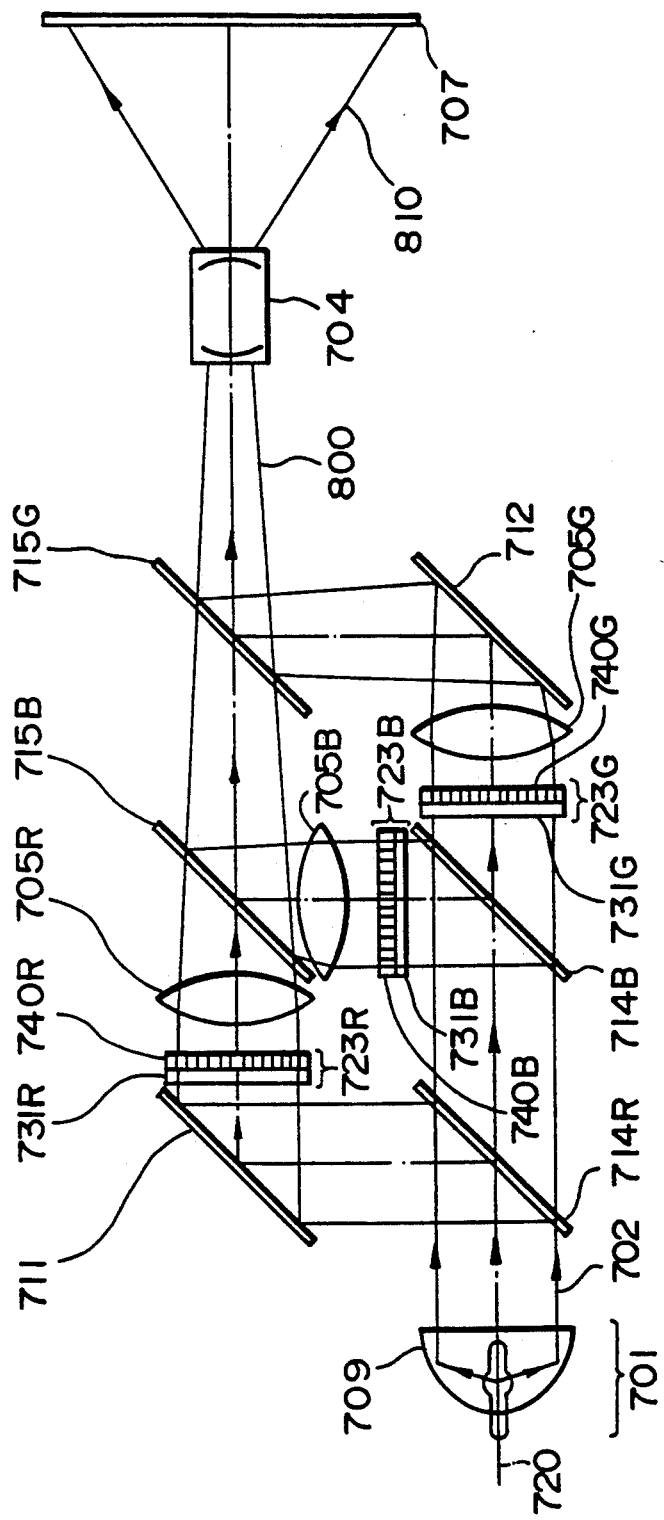
FIG. 11 is a schematic representation showing the structure of a projection display apparatus according to a fifth embodiment of this invention.

A projection display according to a fifth embodiment of this invention will be described with reference to FIG. 11. Reference number 701 designates a light source; 709 and 710 respectively designate a reflecting mirror and a lamp both which collectively form the light source 701; 702 designates a luminous flux; 714R and 714B each designate dichroic mirrors for color separation use; 715B and 715G each designate dichroic mirrors for color composition; 711 and 712 each designate mirrors; 723R, 723G designate and 723B designate light valves; 740R, 740G, and 740B, fiber plates; 731R, 731G, and 731B designates substrates positioned at the incoming-side; 705R, 705G, and 705B designate lenses; and 704 designate a projection lens.

The operation of the projection display apparatus according to the fifth embodiment will now be explained. Like the fourth embodiment, the luminous flux 702 is emitted from the light source 701 in the form of parallel luminous flux. The dichroic mirror 714R reflects red light while allows blue and green light to pass through. The dichroic mirror 714B reflects only blue light whereas it enables green light to pass through. Accordingly, the light valves 723R, 723G, and 723B are illuminated with luminous flux in red, green, and blue, respectively. Upon the surface of respective light valves 723R, 723G, and 723B is produced an image in each color of red, green, and blue by means of non-illustrated exterior circuits. The luminous flux entering each of the light valves 723R, 723G, and 723B either passes through, or is scattered inside. The light emitted from the light valves 723R, 723G, and 723B are luminous fluxes closely parallel to the optical axis 720 selectively filtered by the function of the fiber plates 740R, 740G, and 740B. Like the fourth embodiment, the function of the fiber plates 740R, 740G, and 740B is to absorb scattered light, that is, light emitted from not-selected pixels, and to allow parallel transmitted light, that is, lights emitted from selected pixels, to be transmitted with high efficiency, thereby securing high contrast. The luminous fluxes emitted from the fiber plates 740R, 740G, and 740B in parallel enter the projection lens 704 in the form of a composite luminous flux 800 by way of the lenses 705R, 705G and 705B, the dichroic mirror 715B for reflecting a blue light and the dichroic mirror 715G for reflecting a green light, and the reflecting mirror 712. The thus entered composite luminous flux 800 is then formed into an enlarged color image on a screen 707 for entertainment purposes. The structure and operation of the light valves 723R, 723G, and 723B are similar to those illustrated in FIGS. 8 and 9, but different in that the light valve has no pixels corresponding to primary colors, red, green, and blue but has a black-and-white panel.

With such a structure, the luminous flux emitted at right angles with the light valve can be utilized without any substantial loss, and unwanted light scattered by the light valve can be cut off, and hence an advantage, that is, the production of a projected image enhanced in brightness and contrast, can be obtained in the same manner as in the first embodiment.

Sixth embodiment

Figure 12:
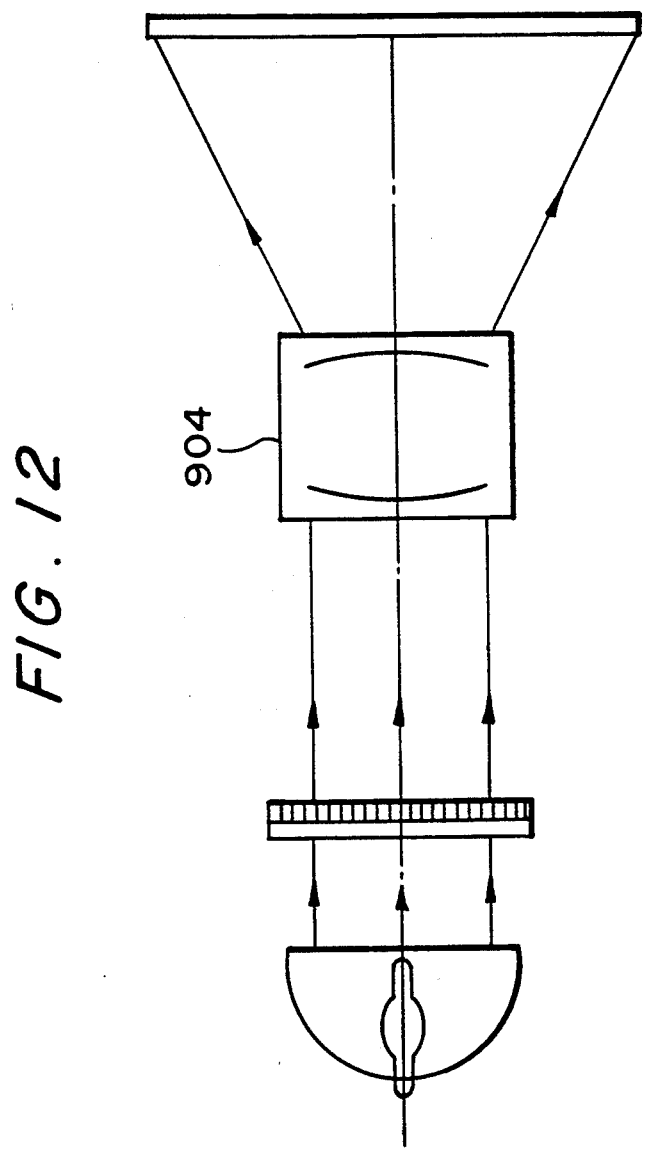
FIG. 12 is a schematic representation showing the structure of a projection display apparatus according to a sixth embodiment of this invention.

FIG. 12 is a view showing the structure of a projection display apparatus according to a sixth embodiment of this invention. In the embodiments set forth in the above, if the dimension of the display area of the light valve is larger than the aperture diameter of the projection lens, a lens is used to send the transmitted luminous flux from the light valve to the projection lens with high efficiency. Meanwhile, if the dimension of the display area of the light valve is smaller than the aperture diameter of the projection lens, as shown in FIG. 12, it becomes possible to omit the lens, and reduce the loss of light and cost. In addition, if a telecentric optical system is employed for the projection lens 904, it is possible to provide a projection display apparatus excellent in the relative illumination ratio.

Seventh embodiment

Figure 13:
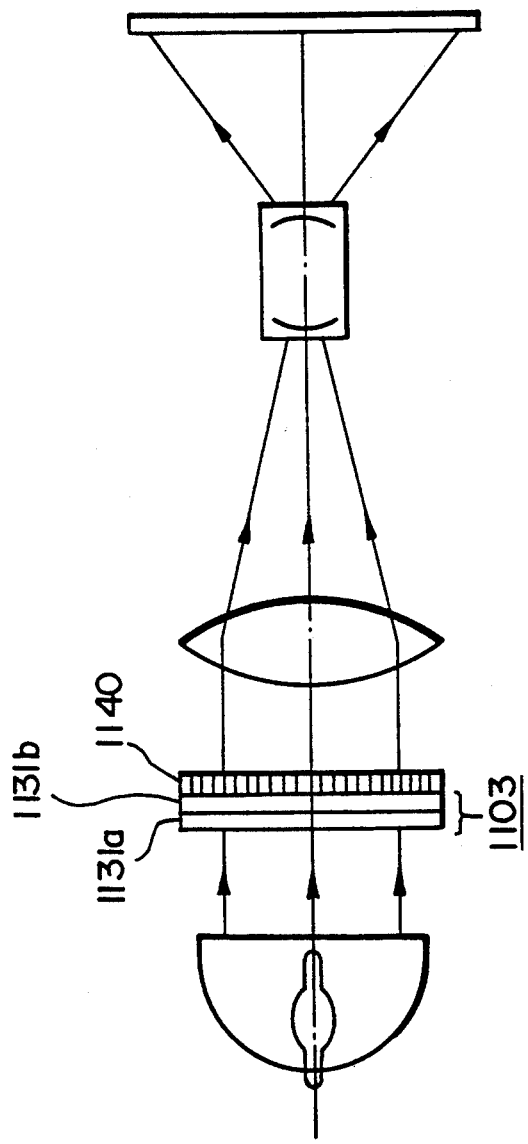
FIG. 13 is a schematic representation showing the structure of a projection display apparatus according to a seventh embodiment of this invention.
Figure 15:
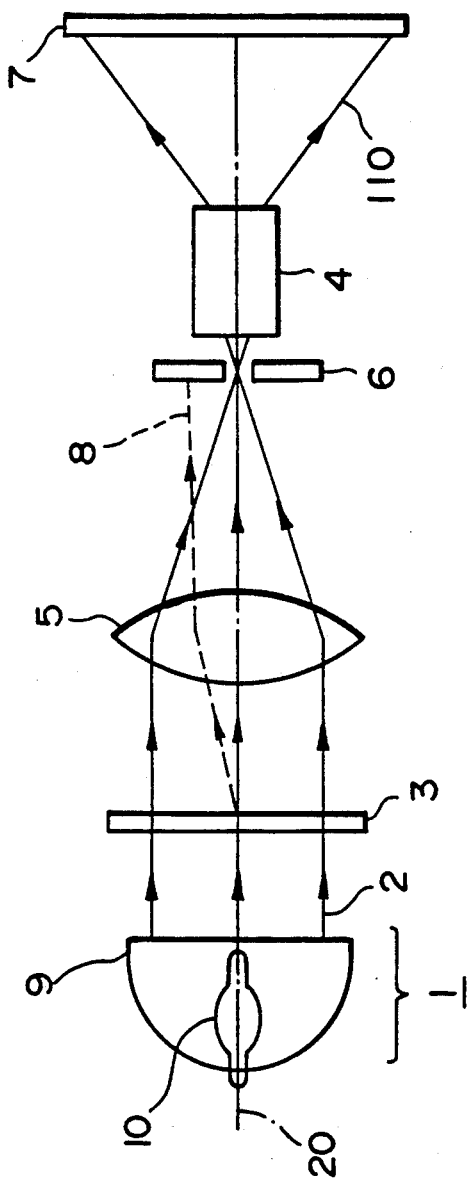
FIG. 15 is a schematic representation showing the structure of a conventional projection display apparatus.
Figure 16:
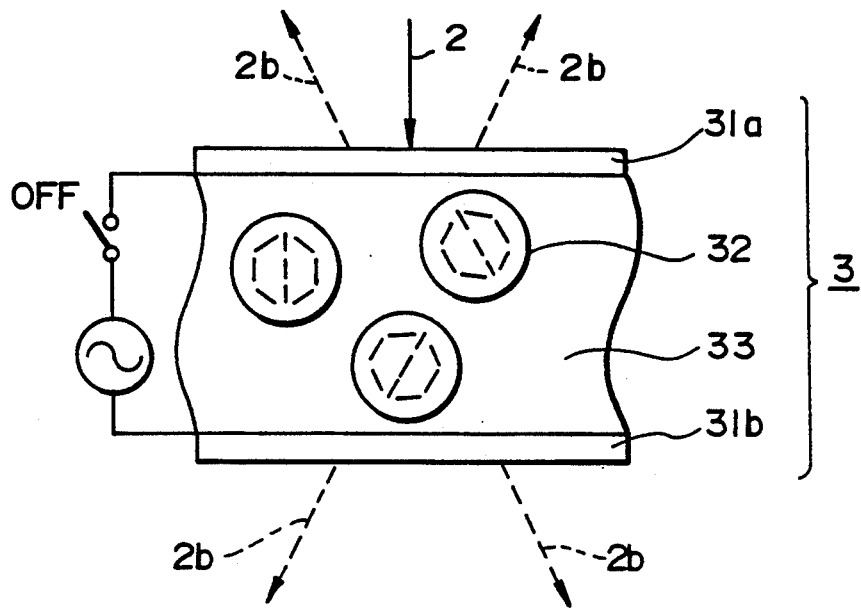
FIG. 16 is a cross-sectional view for explaining the operation of a light valve for use in the conventional projection display apparatus, and particularly showing the arrangement of liquid crystals when 0 voltage is applied.
Figure 17:
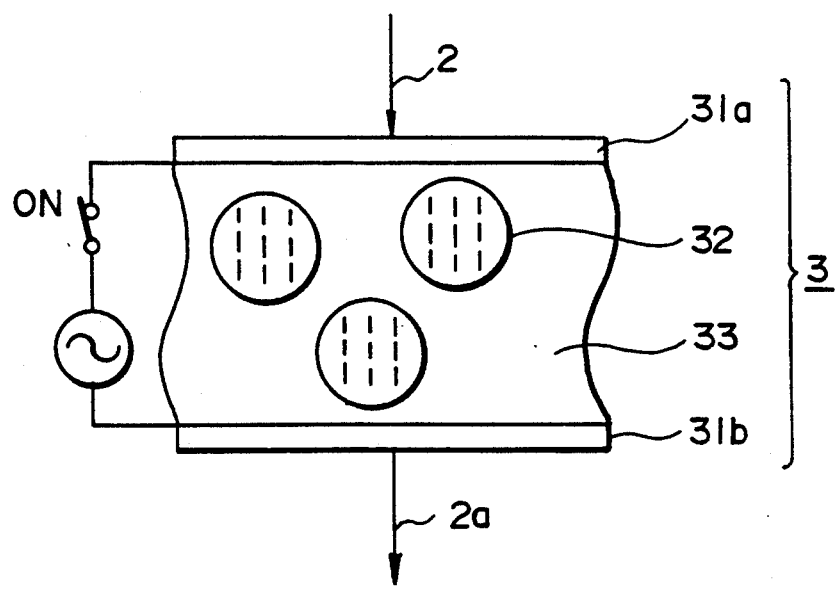
FIG. 17 is a cross-sectional view for explaining the operation of the light valve for use in the conventional display apparatus, and particularly showing the arrangement of liquid crystals when a voltage more than Vth is applied.
Figure 18:
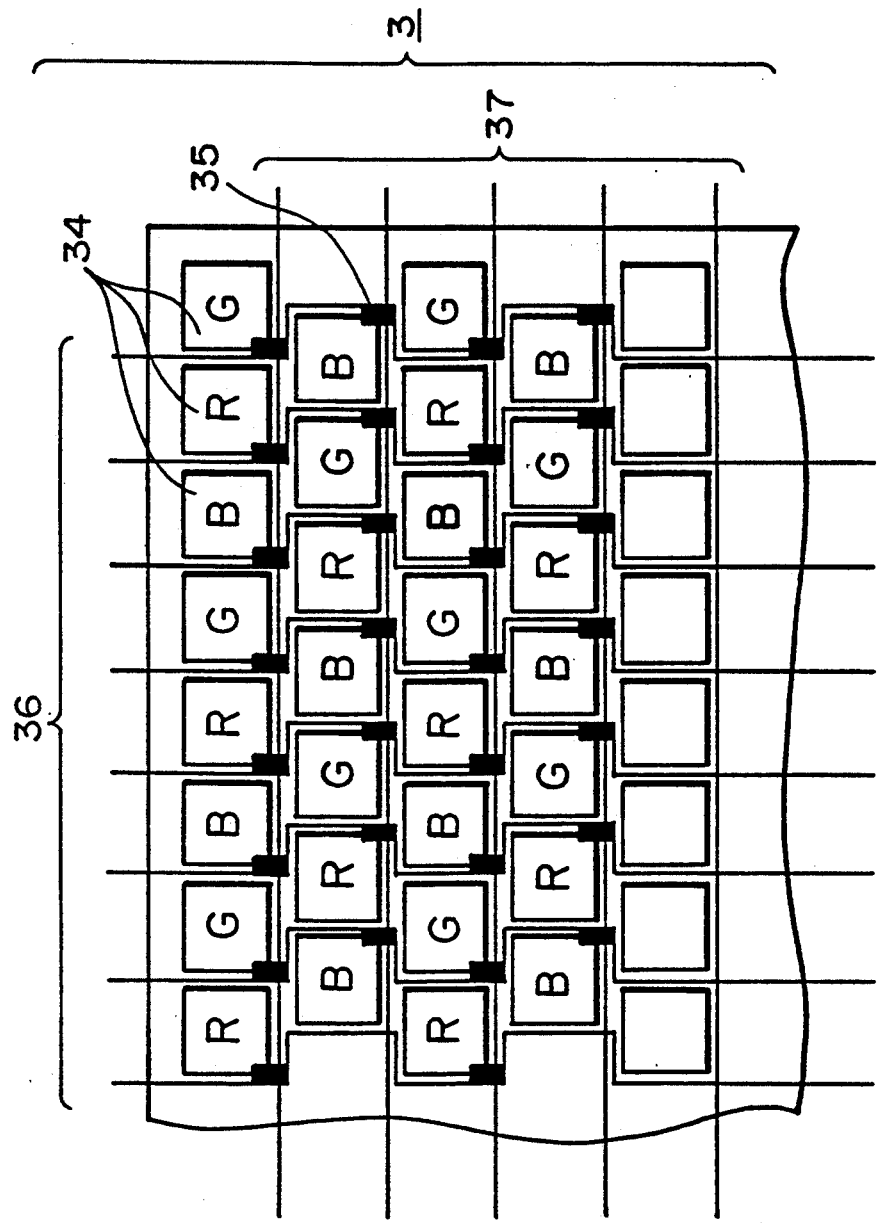
FIG. 18 is a plan view showing the structure of substrates of TFT active matrix liquid crystal panel for use as a light panel in the conventional projection display apparatus.

FIG. 13 is a view showing the structure of a projection display apparatus according to a seventh embodiment of this invention. A light valve 1103 of this embodiment, like the light valve shown in FIGS. 15 to 17, is composed of two glass plates 1131a and 1131b and polymer dispersed liquid crystals, which consist of polymer and liquid crystals, sandwiched between the glass plates. In this case, positioning of a fiber plate 1140 at the outgoing-side of a fiber plate 1140 has advantageous results similar to those obtained by the fifth embodiment.

Eighth embodiment

Figure 14:
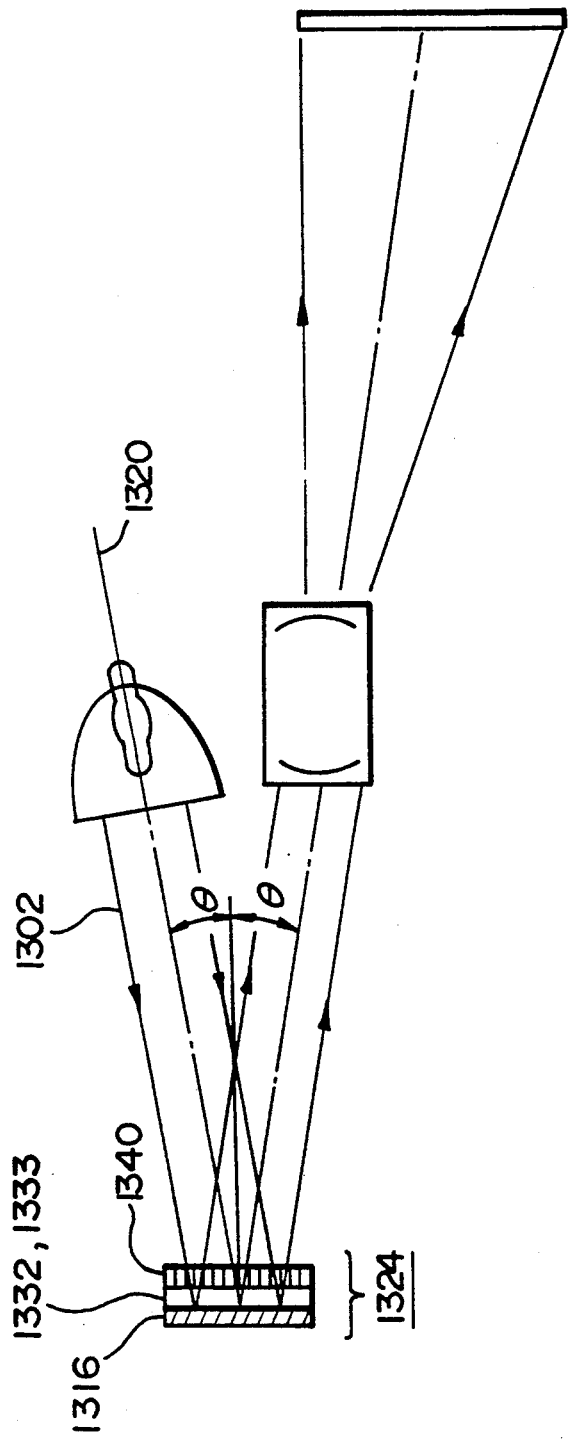
FIG. 14 is a schematic representation showing the structure of a projection display apparatus according to an eighth embodiment of this invention.

FIG. 14 is a view showing the structure of a projection display apparatus according to an eighth embodiment of this invention. Reference numeral 1324 designates a reflecting type liquid crystal light valve composed of a fiber plate 1340 positioned at the image display side thereof, an optical reflecting means 1316 positioned at the other side thereof, and polymer dispersed liquid crystals, which consist of polymer 1333 and liquid crystals 1332, sandwiched between the fiber plate 1340 and the optical reflecting means 1316. A luminous flux 1302 enters into the light valve from the fiber plate side 1340. After the luminous flux 1302 has passed through the fiber plate 1340, light scattered by the polymer dispersed liquid crystal which consists of the liquid crystals 1332 and the polymer 1333 among the transmitted luminous flux is not allowed to pass through the fiber plate 1340 again. Meanwhile, non-scattered light is reflected by the optical reflecting means 1316, and the thus reflected light is allowed to pass through the fiber plate 1340 again.

As shown in FIG. 14, in the case where the reflecting type light valve is adopted, it is necessary to effect the input and output of light by tilting the optical axis 1320 relative to the light valve 1324. In order to effect the transmission of the luminous flux 1320 to the liquid crystals 1332 and 1333 through the fiber plate 1340, the incoming and outgoing angle of the light valve 1324 should be set to less than the maximum incident angle $\theta_{max}$ of the fiber plate 1340.

In the light valve 1324 of the eighth embodiment, the fiber plate 1340 employed for the plate on the image display side may be replaced with glass. In this case, it would be better to place the fiber plate 1340 in front of the image display plate.

Moreover, in the embodiments of Figures, there is used what is called a single plate optical system in which only one light valve is used, whereas in the preceding embodiment, the use of three light valves in conjunction with as many dichroic mirrors enables the realization of a color projection display apparatus.

As has been described before, the combination of the light valve with the fiber plate allows the luminous flux emitted at right angles with the light valve to be transmitted with high efficiency, and filters out unwanted lights scattered by the light valve. Furthermore, since almost all of the foregoing effective luminous flux is incident on the pupil of the projection lens without substantial loss, it is possible to provide a projection display apparatus capable of producing an image with high brightness and contrast.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A projection display apparatus comprising:
   a light source for emitting a parallel luminous flux;
   a light valve for allowing the emitted luminous flux to pass through and controlling the amount of the transmitted light;
   a projection lens for projecting the luminous flux having passed through the light valve onto a screen; and
   luminous flux selective means for allowing a luminous flux entering in a predetermined direction among the light entering from the light valve to be selectively transmitted through.

2. A projection display apparatus according to claim 1, wherein the luminous selective means includes a light guide tube composed of a plurality of minute apertures arranged parallel to each other with the axes thereof aligned in such a manner as to allow a luminous flux entering in an axis direction among light entering from the light valve to selectively pass through.

3. A projection display apparatus according to claim 2, wherein the light valve includes a plurality of pixels, and the plurality of minute apertures have a shape closely similar to the shape of each pixel of the light valve.

4. A projection display apparatus according to claim 2, wherein the light valve includes a plurality of pixels, and the plurality of minute apertures are arranged parallel to each other in a pattern closely similar to the pattern of each pixel of the light valve.

5. A projection display apparatus according to claim 2, wherein the light valve includes a plurality of pixels, and the number of the minute apertures is nearly the same as the number of pixels of the light valve.

6. A projection display apparatus according to claim 2, wherein the light valve includes a plurality of pixels, and each of the plurality of minute apertures corresponds to a predetermined number of pixels of the light valve.

7. The projection display apparatus of claim 2 wherein said light valve includes a plurality of pixels, each said light guide tube aperture having the size of a plurality of said pixels.

8. A projection display apparatus according to claim 1, wherein the light valve comprises a plane substrate; a plane fiber plate including a plurality of unit fibers arranged parallel to each other with the axes thereof aligned so as to allow a luminous flux entering almost along the axis direction to pass through, and positioned parallel to the substrate to function as the luminous flux selective means; and a transmitted light quantity control means including liquid crystals sandwiched between the substrate and the fiber plate for controlling the quantity of transmitted light.

9. A projection display apparatus according to claim 8, wherein the substrate is composed of a material which allows a luminous flux from a light source to pass through, and the light valve is placed between the light source and the projection lens in such a manner that the substrate is positioned on the light source side, and the fiber plate is positioned on the projection lens side.

10. A projection display apparatus according to claim 8, wherein the unit fiber contains a core and a cladding which is coated around the core and has a refractive index different from the refractive index of the core.

11. A projection display apparatus according to claim 8, wherein the transmitted light quantity control means includes a plurality of pixels; the core has a shape closely similar to the shape of the pixels, and is arranged in a similar structure and at a pitch closely similar to the pitch of the pixels; the unit fiber; and the unit fiber includes an absorber positioned so as to face areas other than the pixels for absorbing the luminous flux.

12. A projection display apparatus according to claim 8, further comprising a second substrate interposed between the substrate and the fiber plate, whereby a luminous flux having passed through the substrate, liquid crystals, and second substrate is incident on the fiber plate.

13. The projection display apparatus of claim 1 further comprising a lens for allowing the luminous flux selected by the luminous flux selective means to be incident on the pupil of said projection lens.

14. A projection display apparatus according to claim 13, further comprising:
a plurality of mirrors for splitting the luminous flux emitted from the light source into three primary colors, that is, red, green, and blue;
a plurality of mirrors for combining the split three primary colors together; and
three sets, each set consisting of the light valve, the light guide tube and the lens, provided in such a manner as to acquire the luminous flux of each primary color and to supply the outgoing luminous flux to the composition mirror.

15. The projection display apparatus of claim 1 wherein said light valve includes a transmission/dispersion type liquid crystal.

16. a projection display apparatus comprising:
a light source for emitting a parallel luminous flux;
a light valve for allowing the emitted luminous flux to pass through and controlling the amount of the transmitted light;
a projection lens for projecting the luminous flux having passed through the light valve onto a screen
luminous flux selective means for allowing a luminous flux entering in a predetermined direction among the light entering from the light valve to be selectively transmitted through; and
a reflective substrate;
said light valve being interposed between the reflection substrate and said luminous flux selective means positioned, in approximately the same direction viewed from the light source and the projection lens, so that the luminous flux from the light source is transmitted through the luminous flux selective means and said light valve and is reflected by said reflective substrate to enter the lens after reflection by said reflective substrate and response through said luminous flux selective means.

17. The projection display apparatus of claim 16 wherein said luminous flux selective means comprises:
a plane fiber plate having a plurality of fibers arranged parallel to each other so as to pass only luminous flux substantially parallel to the orientation of the fibers and perpendicular to the plane of the substrate;
said light valve including a liquid crystal layer sandwiched between the fiber plate and the reflective substrate.

18. The projection display apparatus of claim 17 wherein said plane fiber plate forms a first substrate for constraining said liquid crystal layer and said reflective substrate forms the second substrate for constraining the liquid crystal layer.

19. The projection display apparatus of claim 16 further comprising a lens for allowing the luminous flux selected by the luminous flux selective means to be incident on the pupil of said projection lens.

20. A projection display apparatus according to claim 19, further comprising:
a plurality of mirrors for splitting the luminous flux emitted from the light source into the three primary colors, that is, red, green, and blue;
a plurality of composite mirrors for converging the split primary colors; and
three sets, each set including the light valve and the lens, so that the luminous flux in each primary color is incident thereon, and the incoming luminous flux is supplied to the composite mirrors.

21. The projection display apparatus of claim 16 wherein said light valve includes a transmission/dispersion type liquid crystal.

22. A light valve assembly comprising:
a flat fiber plate including a plurality of unit fibers arranged in parallel juxtaposition with each other with collinear axes, each said unit fiber including,
a core, a cladding having a refractive index different from the core, and an absorber surrounding the cladding, said first fiber plate allowing the transmission of only light passing substantially parallel to the axes of the fibers;

transmission light control means including a transmissive/dispersion liquid crystal layer for transmitting light representative of a desired image and for dispersing remaining light not representative of said desired image; and a reflective substrate;

said transmission light control means being located intermediate said flat fiber plate and said reflective substrate said flat fiber plate absorbing dispersed light which is not representative of said desired image.

23. The light valve assembly of claim 22 wherein said flat fiber plate and said reflective substrate form the substrates for containing said liquid crystal layer.

24. The light valve assembly of claim 22 wherein said liquid crystal layer is a polymer dispersed liquid crystal layer.

25. The light valve assembly of claim 22 wherein said liquid crystal layer is a dynamic scattering mode liquid crystal layer.

26. The light valve assembly of claim 22 wherein said liquid crystal layer is a phase change mode liquid crystal layer.

27. The light valve assembly of claim 22 wherein said unit fibers are each of hexagonal cross-section.

28. A light valve assembly comprising:

a flat fiber plate including a plurality of unit fibers arranged in parallel juxtaposition with each other with collinear axes, each said unit fiber including, a core, a cladding having a refractive index different from the core, and an absorber surrounding the cladding; and transmission light control means for transmitting light representative of a desired image and for dispersing remaining light not representative of said desired image, said transmission light control means including a transmissive/dispersion liquid crystal layer;

said fiber plate allowing the transmission of only light passing substantially parallel to the axes of the fibers by absorbing dispersed light not representative of said desired image.

29. The light valve assembly of claim 28 wherein said flat fiber plate and a reflective substrate form substrates for containing said liquid crystal layer.

30. The light valve assembly of claim 28 wherein said liquid crystal layer is a polymer dispersed liquid crystal layer.

31. The light valve assembly of claim 28 wherein said liquid crystal layer is a dynamic scattering mode liquid crystal layer.

32. The light valve assembly of claim 28 wherein said liquid crystal layer is a phase change mode liquid crystal layer.

33. The light valve assembly of claim 28 wherein said transmissive/dispersive liquid crystal is selected from a group consisting of a polymer dispersed liquid crystal layer, a dynamic scattering mode liquid crystal layer and a phase change mode liquid crystal layer and is positioned in juxtaposition to said fiber plate.

34. A light valve assembly comprising:

a flat fiber plate including a plurality of unit fibers arranged in parallel juxtaposition with each other with collinear axes, each said unit fiber including, a core, and an absorber surrounding the core, and transmission light control means for transmitting light representative of a desired image and for dispersing remaining light not representative of said desired image and including a transmissive/dispersive liquid crystal layer;

said fiber plate allowing the transmission of only light passing substantially parallel to the axes of the fibers by absorbing dispersed light not representative of said desired image.

35. The light valve assembly of claim 34 wherein said transmissive/dispersion liquid crystal layer is selected from a group consisting of a polymer dispersed liquid crystal layer, a dynamic scattering mode liquid crystal layer and a phase change mode liquid crystal layer and is positioned in juxtaposition to said fiber plate.

36. The light valve assembly of claim 34 wherein the refractive index of the absorber is greater than the refractive index of the core.

37. A method of developing a projected image comprising the ordered steps of:

a) developing relatively collinear luminous flux;

b) modulating said luminous flux to a desired image by scattering luminous flux which is not to be part of the projected image to form substantially columinated image luminous flux;

c) using a luminous flux selection device to remove substantially all scattered luminous flux from said collimated image luminous flux;

d) directing said columinated image luminous flux to a screen for projection thereon.

38. The method of claim 37 wherein said step d of directing includes focusing the image luminous flux on a projection lens assembly and using the projection lens assembly to project the image luminous flux on the screen.

39. The method of claim 37 wherein said luminous flux selection device includes a flat fiber plate including a plurality of unit fibers arranged in parallel juxtaposition with each other with collinear axes, said fiber plate allowing non-dispersed light representative of the desired image to pass while absorbing dispersed remaining light.

40. A light valve assembly for modulating light transmitted along an image path into an image to be viewed at a viewing location comprising:

a transmissive/dispersion liquid crystal for transmitting only light representative of a desired image and dispersing remaining light; and a dispersed light absorber disposed intermediate between said transmissive/dispersion liquid crystal and the viewing location and attenuating the dispersed remaining light to enhance image contrast.

41. The light valve assembly of claim 40 wherein said light absorber comprises a flat fiber plate including a plurality of unit fibers arranged in parallel juxtaposition with each other with collinear axes, said fiber plate allowing non-dispersed light representative of the desired image to pass while absorbing dispersed remaining light.

42. The light valve assembly of claim 41 wherein each said unit fiber includes, a core, a cladding having a refractive index different from said core, and an absorber surrounding said cladding, said absorber absorbing said dispersed remaining light.

43. A light valve assembly comprising:
a first substrate including luminous flux selective means for allowing the transmission of only light passing substantially perpendicularly to a plane defined by said first substrate and substantially eliminating dispersed light;
a transmission/dispersion mode liquid crystal layer transmitting light representative of a desired image and dispersing remaining light not representative of said desired image; and
a second substrate constraining said liquid crystal layer; and
said transmission/dispersion liquid crystal layer being located intermediate said first substrate and said second substrate.

44. The light valve assembly of claim 43 wherein said second substrate is transparent.

45. The light valve assembly of claim 43 wherein said second substrate is reflective.

46. The light valve assembly of claim 43 wherein said luminous flux selective means includes a light guide tube.

47. The light valve assembly of claim 46 wherein said light guide tube includes a plurality of apertures formed in a plate member.

48. The light valve assembly of claim 47 wherein said apertures are substantially square.

49. The light valve assembly of claim 48 wherein said apertures extend across the plane of said first substrate in rows, adjacent rows being offset from each other a distance substantially equal to one half the aperture spacing.

50. The light valve assembly of claim 46 wherein said light guide tube includes a plurality of hollow pipes having substantially parallel axes extending in a direction substantially perpendicular to the plane of said first substrate.

51. The light valve assembly of claim 47 wherein said apertures are formed in said plate member by laser machining or etching.

52. The light valve assembly of claim 43 wherein said luminous flux selective means includes a fiber plate including a plurality of unit fibers.

53. The light valve assembly of claim 52 wherein said unit fibers are cylindrical in cross-section.

54. The light valve assembly of claim 52 wherein said unit fibers are hexagonal in cross-section.

55. The light valve assembly of claim 43 wherein said fiber plate includes a plurality of unit fibers arranged in parallel juxtaposition with each other with co-linear axes, each said unit fiber including,
a core,
a cladding having a refractive index different from the core, and
an absorber surrounding the cladding.

56. The light valve assembly of claim 43 wherein said fiber plate includes a plurality of unit fibers arranged in parallel juxtaposition with each other with co-linear axes, each said unit fiber including
a core, and
an absorber surrounding the core.

* * * * *

UNITED STATES PATENT AND TRADEMARK OFFICE
CERTIFICATE OF CORRECTION

PATENT NO. : 5,321,789
DATED : June 14, 1994
INVENTOR(S) : Hiroshi KIDA et al.

It is certified that error appears in the above-indentified patent and that said Letters Patent is hereby corrected as shown below:

COLUMN 9:

Line 57, "n = 1.5" should be -- $n_o = 1.5$ --;

Line 61, "NA - V⁻ $(n_o^1 - n_o^1) \leq 0.2$" should be -- NA = $\sqrt{(n_o^2 - n_o^1)} \leq 0.2$ --;

Line 63, "n within" should be -- $n_1$ within --;

Line 65, "$1.487 < n_1 < 1.5$" should be -- $1.487 \leq n_1 < 1.5$ --.

Signed and Sealed this

Eighteenth Day of April, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,321,789
DATED : June 14, 1994
INVENTOR(S) : Hiroshi KIDA et al.

It is certified that error appears in the above-indentified patent and that said Letters Patent is hereby corrected as shown below:

COLUMN 9:

Line 61, "$NA - \sqrt{(n_0^1 - n_0^1)} \leq 0.2$" should be
--$NA = \sqrt{(n_0^2 - n_1^2)} \leq 0.2$--.

Signed and Sealed this

Nineteenth Day of December, 1995

*Attest:*

BRUCE LEHMAN

*Attesting Officer*    *Commissioner of Patents and Trademarks*